United States Patent
Ostrom et al.

(10) Patent No.: US 8,120,346 B2
(45) Date of Patent: *Feb. 21, 2012

(54) METHODS AND APPARATUS FOR CURRENT SENSING

(75) Inventors: Kenneth A. Ostrom, Palos Verdes Estates, CA (US); Timothy M. Ng, Monterey Park, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 568 days.

This patent is subject to a terminal disclaimer.

(21) Appl. No.: 12/332,707

(22) Filed: Dec. 11, 2008

(65) Prior Publication Data

US 2009/0146643 A1 Jun. 11, 2009

Related U.S. Application Data

(60) Provisional application No. 61/012,894, filed on Dec. 11, 2007.

(51) Int. Cl.
   *G05F 1/40* (2006.01)
(52) U.S. Cl. .................. 323/285; 323/283; 323/272

(58) Field of Classification Search .................. 323/222, 323/272, 275, 224, 277, 282–288; 363/16–17, 363/56.01, 56.02, 97, 98, 132
See application file for complete search history.

(56) References Cited

U.S. PATENT DOCUMENTS

| 6,249,447 B1 * | 6/2001 | Boylan et al. ................... 363/97 |
| 6,414,469 B1 | 7/2002 | Zhou et al. |
| 6,465,993 B1 | 10/2002 | Clarkin et al. |
| 6,469,481 B1 * | 10/2002 | Tateishi ........................ 323/282 |
| 6,567,279 B2 * | 5/2003 | Brkovic ........................ 363/17 |
| 6,600,298 B2 | 7/2003 | McDonald et al. |
| 6,683,441 B2 | 1/2004 | Schiff et al. |
| 6,737,840 B2 | 5/2004 | McDonald et al. |
| 7,233,132 B1 * | 6/2007 | Dong et al. ..................... 323/272 |

* cited by examiner

*Primary Examiner* — Rajnikant Patel
(74) *Attorney, Agent, or Firm* — Murphy, Bilak & Homiller, PLLC

(57) ABSTRACT

Methods and apparatus for current sensing according to various aspects of the present invention sense the current in a circuit, such as an inductor circuit. The current sensing systems may comprise an RC element connected such that the RC time constant matches the L/R time constant of the inductor. The current sensor may be configured to generate voltages that are proportional to the instantaneous current in the inductor with scaled gain for a wide range of inductor self resistance (DCR) values.

16 Claims, 5 Drawing Sheets

$$V_1 = i_1 r + L \frac{\partial}{\partial t} i_1$$

$$V_1 = Vc + RC \frac{\partial}{\partial t} Vc$$

*let*

$$L/r = RC$$

*then*

$$Vc = i_1 r$$

METHODS AND APPARATUS FOR CURRENT SENSING

CROSS-REFERENCES TO RELATED APPLICATIONS

This application claims the benefit of U.S. Provisional Patent Application No. 61/012,894, filed Dec. 11, 2007, and incorporates the disclosure of such application by reference.

BACKGROUND OF THE INVENTION

Switching power supplies are popular for high power applications because of the high efficiency and small area/volume required. Buck converters in particular are well suited to providing the high current at low voltages needed by high performance digital integrated circuits such as microprocessors, graphics processors, and network processors. For example, a buck converter is often used to step down a DC voltage (typically referred to as the input voltage) to a lower DC voltage (typically referred to as the output voltage). Since the power stage is fully switched (i.e., the power MOSFET is fully off or on), there is very little loss in the power stage and the converter power efficiency is very high.

Many power supplies operate in conjunction with current sensors to monitor the current in the power supply and the load. Referring to FIG. 4, one widely used lossless current sensing technique is known as inductor DCR current sense. For simplification, FIG. 4 illustrates the widely used "output reference" equivalent form, where the output voltage is shown as ground, and the voltage applied across the inductor ($V_{in}$-$V_{out}$) is shown as V1. By adding the RC network in parallel with the inductor L with its parasitic DC resistance r, and matching the time constants, the voltage across the capacitor C is proportional to the current through the inductor multiplied by the DCR. A voltage amplifier can then be used by the PWM controller to generate the desired signal representing the current through the inductor. This method is popular because the DCR of inductors is well controlled and characterized for tolerance and temperature variation, resulting in accurate current sensing.

This lossless current sense method, however, does not present a constant DC impedance to the sense amplifier. Instead, the choice of R is dependent on C, DCR and L. A further limiting factor is that the value choices for C are restricted to commonly widely spaced commercially available values, such as 0.1 uf, 0.12 uf, 0.15 uf, 0.18 uf, 0.22 uf, 0.27 uf and 0.33 uf. Consequently, a constant choice for R cannot be practically selected to match an arbitrary choice of L and DCR. Further, the gain of the sensed voltage presented to the sense amplifier is dependent on the DCR of the inductor.

FIG. 5 shows such a lossless inductor current sensing system applied to a DC/DC buck converter topology. A current sense amplifier (A1) associated with the buck controller interfaces between the current sense network and PWM control circuitry. The current sense amplifier topology may or may not be sensitive to the impedance of the sense network. The DC impedance of the network as presented to the sense amplifier is a function of the L and DCR values and therefore varies for different inductors. Further, the gain of the sense network is not a constant, but is a function of the DCR value. As a result, the dynamic range requirements of the sense amplifier are a function of DCR and the gain of signal representing the inductor current and may vary from one application to the next.

SUMMARY OF THE INVENTION

Methods and apparatus for current sensing according to various aspects of the present invention sense the current in a circuit, such as an inductor circuit. The current sensing systems may comprise an RC element connected such that the RC time constant matches the L/R time constant of the inductor. The current sensor may be configured to generate voltages that are proportional to the instantaneous current in the inductor with scaled gain for a wide range of inductor self resistance (DCR) values.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of circuits, technologies, techniques, and methods configured to perform the specified functions and achieve the various results. For example, the present invention may employ various controllers, sensors, power supplies, logic circuits, amplifiers, output stages, and the like, which may carry out a variety of functions. In addition, the present invention may be practiced in conjunction with any number of devices for performing the various functions, and the systems described are merely exemplary embodiments and applications. Further, the present invention may employ any number of conventional techniques controlling output stages, receiving and processing signals, sensing voltages and currents, amplifying signals, and the like.

Figure 1:
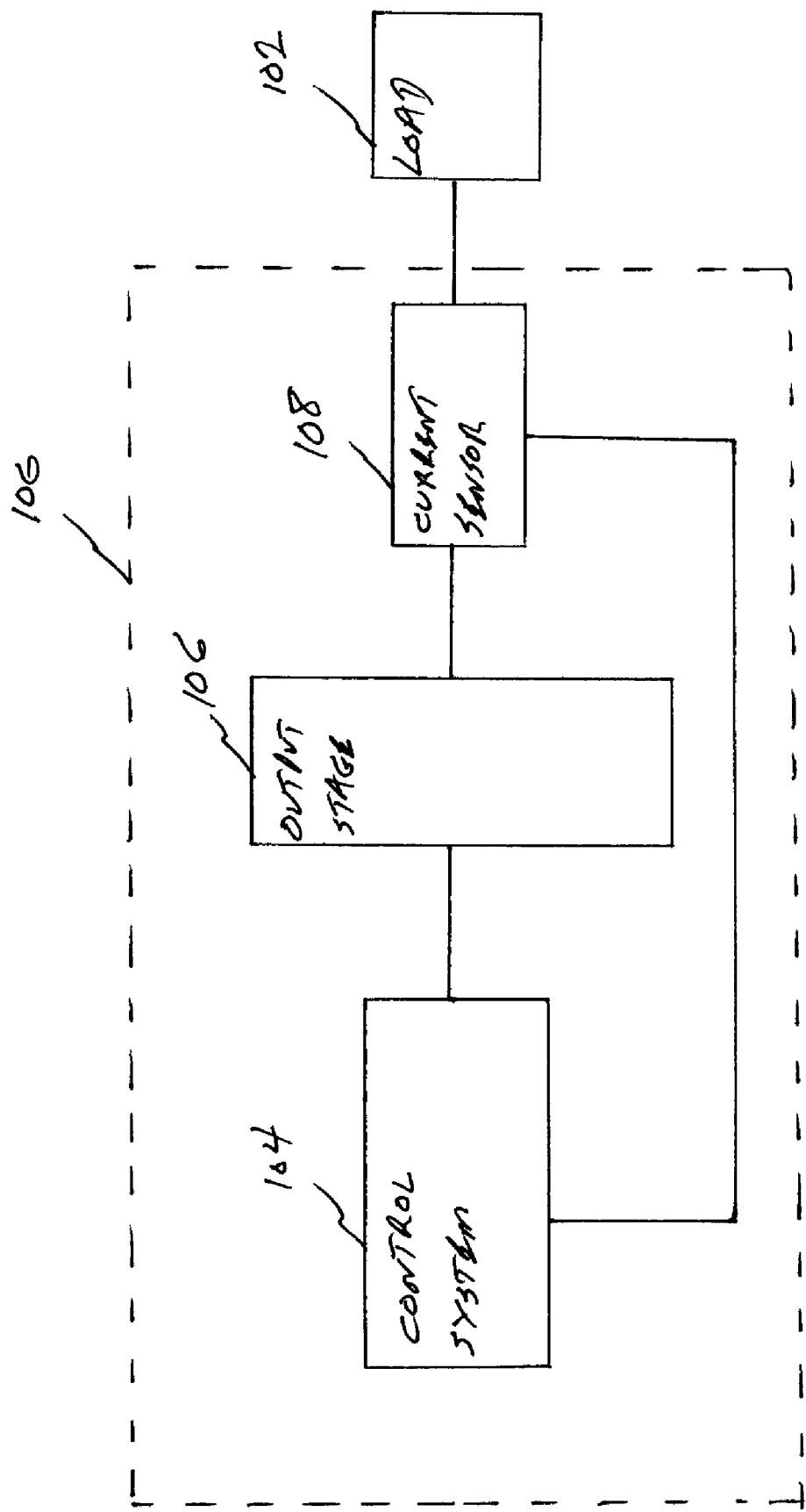
FIG. 1 is a block diagram of a power supply according to various aspects of the present invention coupled to a load.

Methods and apparatus for supplying a load according to various aspects of the present invention operate in conjunction with a current sensor adapted to sense the current provided to a load. For example, referring to FIG. 1, a power supply 100 for supplying current to a load 102 according to various aspects of the present invention comprises a control system 104, an output stage 106, and a current sensor 108. The control system 104 drives the output stage 106, and the output stage 106 provides current to the load 102. The current sensor 108 detects the current in the load 102 and provides a corresponding signal to the control system 104 to control the output stage 106 accordingly. Various aspects of the present invention may be applied to any appropriate power supply, such as buck, boost, buck-boost, forward, flyback, half-bridge, full-bridge, and SEPIC topologies. Further, various aspects of the present invention may be applied to any suitable circuit where lossless sensing of inductor current is of use. In addition, various aspects of the present invention relate to providing a signal to a sensing element. In the present embodiment, the sensing element comprises the control system 104 and/or an amplifier, but the sensing element may comprise any suitable system configured to receive the signal from the current sensor 108.

Figure 2:
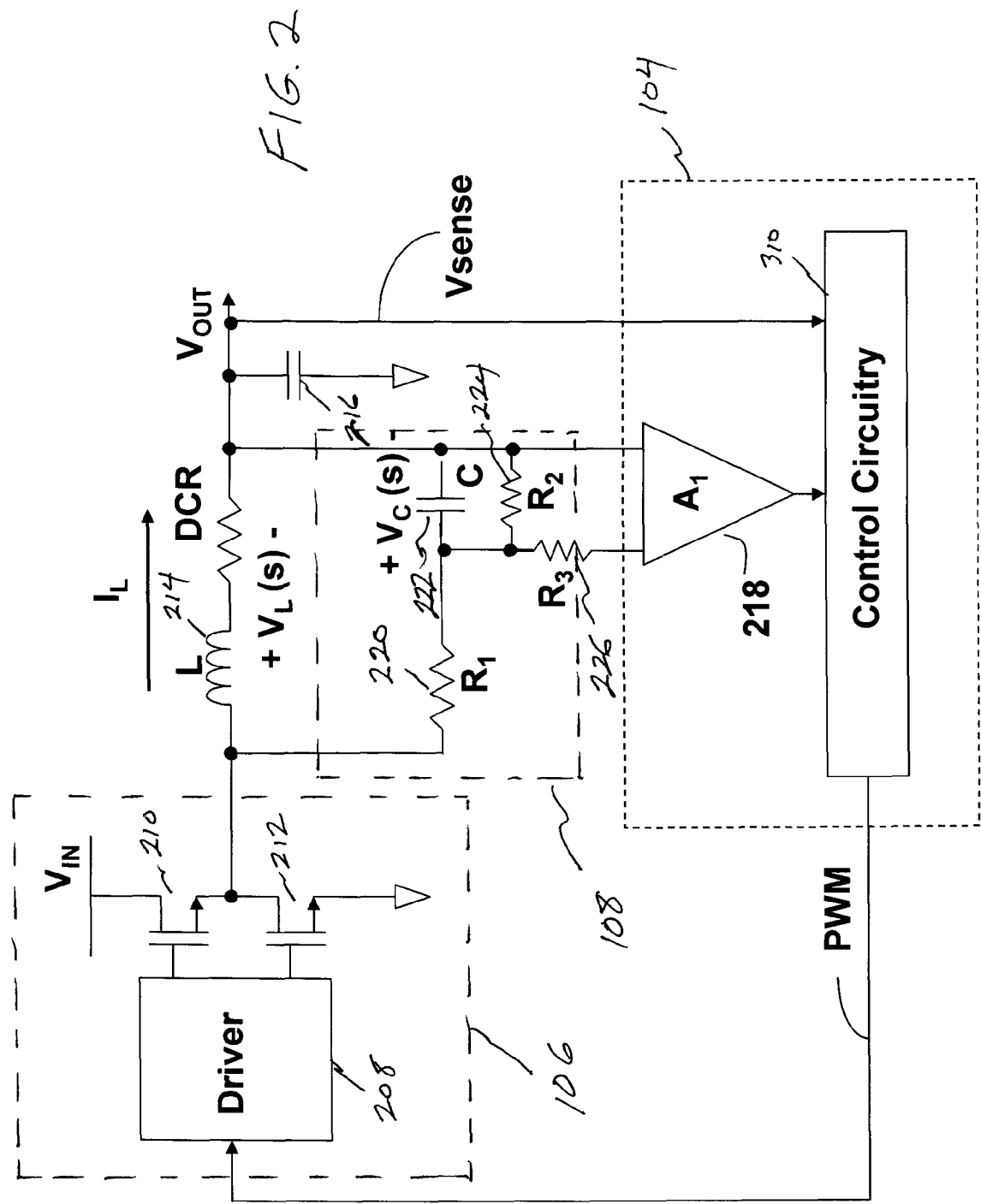
FIG. 2 is a schematic of a current sensor according to various aspects of the present invention.

The output stage 106 is responsive to the control system 104 and provides current to the load 102 according to a drive signal from the control system 104. The output stage 106 may comprise any appropriate system for providing current to the load 102 according to signals from the control system, such as a conventional output stage for a buck converter. The output stage 106 may also comprise a single phase or multiple phases. Referring to FIG. 2, an exemplary single-phase output stage 106 for a DC/DC buck converter may comprise a driver circuit 208, a high-side FET 210, and a low-side FET 212. The driver circuit 208 alternately drives the FETs 210, 212 to alternately connect the load 102 to the input voltage $V_{IN}$ according to signals from the control system 104, such as a conventional pulse width modulated control signal.

A filter circuit smoothes the voltage and current applied to the load 102. The filter circuit may comprise any suitable filter system, such as an analog or digital filter. In the present embodiment, the filter circuit comprises passive components, such as an inductor 214 and a capacitor 216. For example, the filter circuit may comprise a conventional buck inductor and decoupling capacitor for a buck converter. The alternating activation of the FETs 210, 212 by the driver circuit 208 generates a switching waveform or square wave that is subsequently filtered by the filter circuit, which allows the output voltage $V_{out}$ to be set by controlling the duty cycle of the waveform. While the present embodiment relates to a single inductor 214, the power supply 100 may be adapted to employ multiple inductors and/or to sum the current in two or more inductors.

The control system 104 generates the control signal to drive the output stage 106. The control system 104 may generate the control signal according to any appropriate techniques and criteria, such as using conventional voltage and/or current feedback to control the voltage and/or current applied to the load 102. The control system 104 may also include any appropriate elements and systems for generating the control signal, and the topology of the control system 104 may be analog and/or digital control based. For example, referring again to FIG. 2, the control system 104 may include a PWM controller 310 generating a PWM drive signal to drive the output stage 106. The control system 104 may control the output stage 106 according to any appropriate criteria, such as output voltage and/or output current at the load 102.

In the present embodiment, the PWM controller 310 comprises a conventional PWM-based voltage regulator for a power supply that adjusts the duty cycle of a PWM drive signal according to output voltage and/or current compared to one or more target output voltages and/or currents. The PWM controller 310 may monitor the output voltage as well as the load 102 current, which may facilitate various control functions. For example, the current in the inductor 214 is representative of the instantaneous load 102 current, which can be used to implement adaptive voltage positioning (AVP) or current mode control or to monitor the operating condition of the power supply 100. The inductor 214 current also represents the current through the power devices, the MOSFETs 210, 212, and the inductor 214, all of which have maximum current limitations which must be adhered to. Furthermore, in multi-phase converters, the inductor 214 current may be balanced between phases so that the load 102 current is evenly distributed among phases, so the current balance control mechanism requires the ability to sense the current in each phase. Thus, the PWM controller 310 may utilize the sensed current to optimize the supply of power, limit the maximum output current, and/or implement load dependent output voltage such as adaptive voltage positioning (AVP).

The power supply 100 may further comprise an amplifier 218 to amplify the signal from the current sensor 108 and provide the amplified signal to the control system 104. The amplifier 218 may comprise any appropriate system for amplifying a signal, such as a conventional op-amp-based amplifier. The amplifier 218 may comprise a separate component or be integrated into another component, such as the sensor 108 or the control system 104. In the present embodiment, the amplifier 218 is part of the control system 104 and provides the amplified current sensor 108 signal to the PWM controller 310.

The current sensor 108 senses the current through the inductor 214 and provides a corresponding inductor current signal to the control system 104, such as via the amplifier 218. The inductor current signal output by the current sensor 108 may be interfaced to the PWM controller 310, however, in any appropriate manner. The current sensor 108 of the present embodiment is adapted for accurately sensing the current in inductors, such as the inductor 214. The current sensor 108 may thus generate the inductor current signal representing the current in the inductor 214, the load 102, and/or other elements of the power supply 100.

Referring again to FIG. 2, the current sensor 108 may comprise an inductor self resistance (commonly referred to as DCR) current sensor for monitoring the load 102 current. For example, the current sensor 108 may comprise an RC circuit connected such that the RC time constant matches the L/R time constant of the inductor 214. The self resistance of the inductor 214 is represented as a separate resistance DCR in FIG. 2. With suitable sensor design and component value selection, the current sensor 108 may generate voltages that are proportional to the instantaneous current in the inductor 214. Further, the current sensor 108 may be normalized, such that the source DC impedance and/or current sensor 108 gain may be scaled to a constant level or to achieve a particular range of output voltages for a wide range of inductor self resistance (DCR) values. While the present discussion relates to a specific implementation of the current sensor 108, other current sensor 108 circuit topologies may benefit from the attributes of selectable impedance and/or gain, and the implementations and principles of the present embodiment may be adapted to such other topologies.

In one embodiment, the current sensor 108 comprises a series combination of a first resistor 220 having a resistance R1 and a capacitor 222 having a capacitance C, and the series combination is connected in parallel with the inductor 214 having an inductance L and a self resistance DCR. A second resistor 224 having a resistance R2 may be connected in parallel with the capacitor 222, and the node connecting the load side of the inductor 214, capacitor 222, and second resistor 224 is connected to one input of the amplifier 218. In various embodiments, a third resistor 226 having a resistance R3 may be connected between one input of the amplifier 218 and the node between the first resistor 220 and the supply side of the capacitor 222 and the second resistor 224.

The current in the inductor 214 with self resistance DCR is sensed by the current sensor 108. The sensed voltage across the capacitor 222 ($V_c(s)$) may be expressed in the s domain as:

$$V_C(s) = \frac{\left(\frac{s \cdot L}{DCR} + 1\right)}{\left(s \cdot \frac{(R_1 \cdot R_2)}{R_1 + R_2} \cdot C + 1\right)} \cdot K \cdot DCR \cdot I_L$$

where K=R2/(R2+R1) and $I_L$ is the current in the inductor.

The resistor values R1 and R2 and the capacitor value C may be selected such that the RC time constant of the current sensor 108 is equal to the L/R time constant of the inductor 214. With the matching time constants, the voltage across the capacitor 222 may be proportional to the current flowing in the inductor 214. For example, to match time constants, the resistor and capacitor values may be selected according to the following equation such that the voltage across the capacitor 222 ($V_c(s)$) is proportional to the voltage across the inductor 214 and thus proportional to the current in the inductor 214:

$$L/DCR = (R1//R2)*C$$

The resistance of the combination of the first and second resistors 220, 224 (represented by (R1//R2)) may be selected such that the sensed voltage $V_c(s)$ may be scaled independently of the values of L and DCR.

Further, the value R3 for the third resistor 226 may be selected such that the DC impedance of the current sensor with respect to the amplifier 218 meets a target value:

$$(R1//R2)+R3 = \text{target impedance}$$

With the introduction of R3, the DC impedance seen looking back into the current sensor 108 from one terminal of the amplifier 218 may be chosen to be a target value. Consequently, the resistor values for the current sensor 108 may be modified according to the inductor characteristics and capacitor characteristics while maintaining substantially identical impedance and signal ranges from the perspective of the control system 104.

The present current sensor 108 facilitates providing substantially selectable impedance and gain. The parallel combination of the first and second resistors 220, 224 facilitates scaling the nominal delta voltage that appears across the capacitor 222 to be a constant range independent of the DCR to optimize design of the amplifier 218 dynamic range for highest accuracy. In many implementations, it is desired to be able to scale the sense voltage so that a fixed amplitude corresponds to a certain current, making the signal amplitude independent of the inductor DCR. This may be referred to as having a gain scaled, or constant gain, current sensor 108. As previously disclosed, the resistor values R1 and R2 may be selected to achieve a selected gain, thus enabling optimization of the dynamic range of current sense amplifier 218 and its related elements. In addition, the accuracy of amplifier 218 topologies that are not high impedance may be improved if the current sensor 108 presents a selected DC impedance to the amplifier 218 independent of the particular characteristics of the inductor 214.

Figure 3:
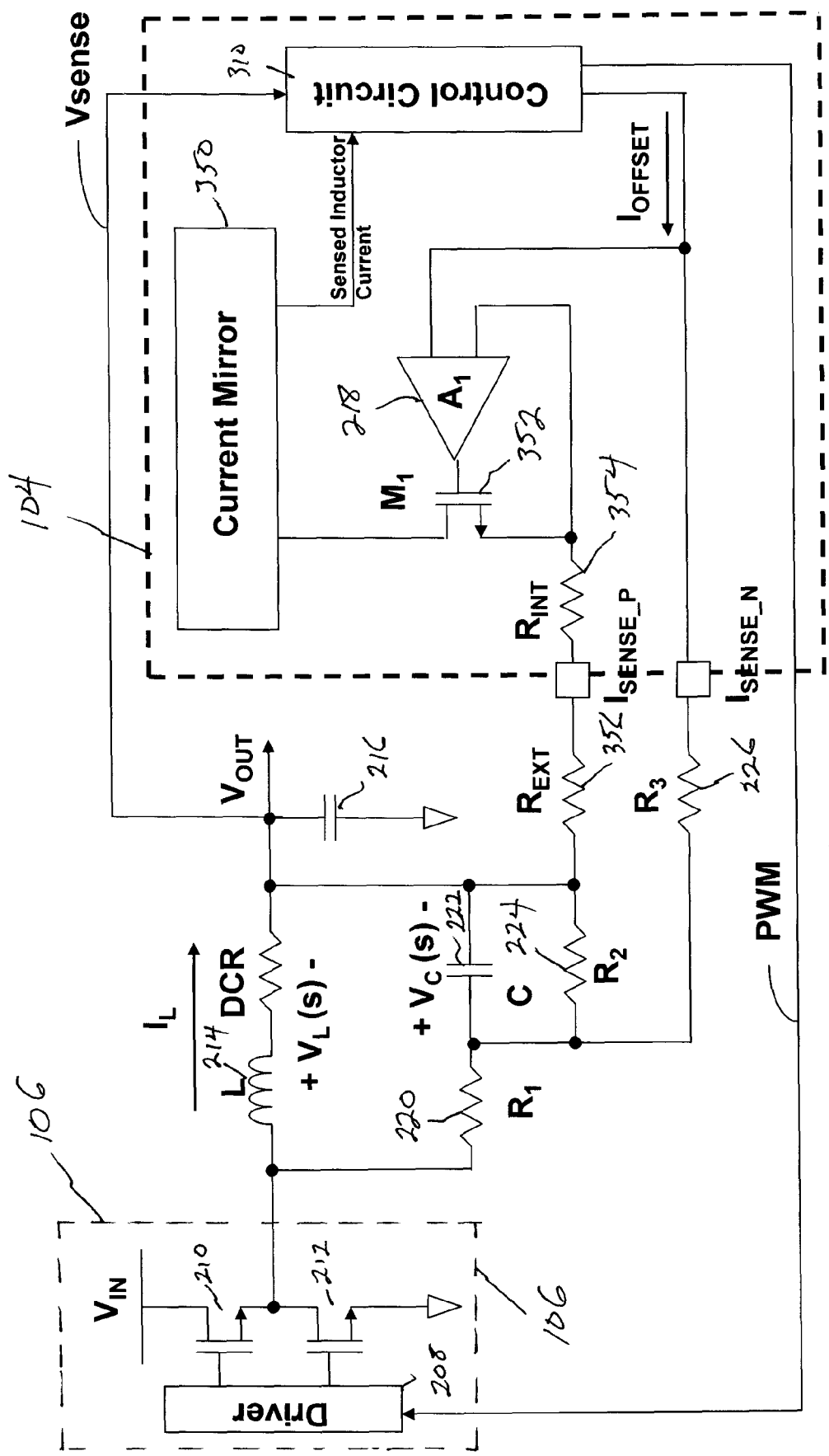
FIG. 3 is a schematic of an alternative implementation of a current sensor according to various aspects of the present invention.
Figure 4:
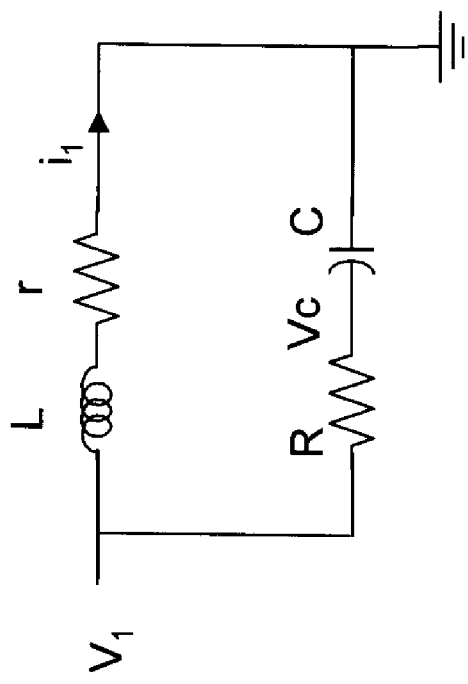
FIG. 4 is a schematic of an illustrative prior art current sensor.
Figure 5:
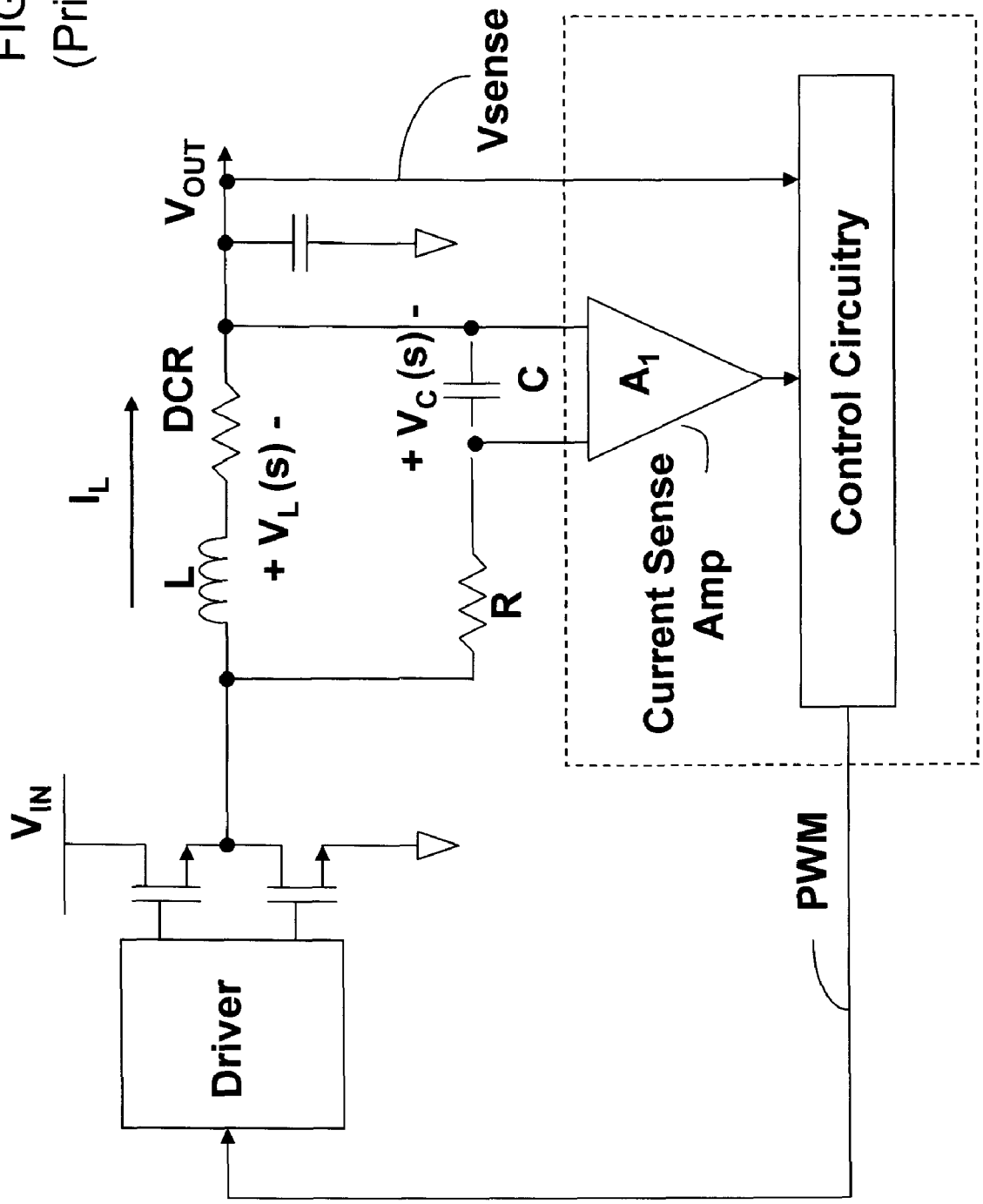
FIG. 5 is a schematic of another illustrative prior art current sensor.

The current sensor 108, amplifier 218, and/or control system 104 may be modified, for example to integrate various aspects of the current sensor 108 and/or amplifier 218 into the control system 104. For example, referring to FIG. 3, an exemplary current sensor 108 may be at least partially integrated into the control system 104. The amplifier 218 drives a transistor 352, such as a MOSFET, which drives a current mirror circuit 350. The current mirror circuit 350 provides the resulting sensed current signal to the PWM controller 310. In certain applications, the current mirror 350 may mirror the current in the transistor 352 to facilitate coupling of the current sensor 108 to the PWM controller 310.

The control system 104 may include additional components, such as to bias the transistor 352. For example, the control system 104 may generate a bias current $I_{offset}$, to facilitate biasing of the transistor 352 when the sensed current is near zero. The transistor 352 may also be biased by additional resistors, such as an internal resistor 354 and/or an external resistor 356, to provide further degrees of freedom in the biasing of the transistor 352.

The current sensor 108 facilitates sensing the current in the inductor 214 with selectable gain and selectable impedance that may be adjusted to provide constant input parameters to the control system 104 for different inductors 214. The DC impedance looking back into the external elements of the current sensor 108 from the Isense_N terminal of the control system 104 can be selected to be a particular value. By proper selection of the values for R1, R2 and R3, the biasing of transistor 352 and the offset of current sense amplifier 218 may be controlled independently of the values of L and DCR.

Example 1

The values of the various components may be selected according to any appropriate criteria, such as inductor 214 characteristics, capacitor 222 characteristics, desired impedance, and/or maximum sensed voltage. For example, the inductor 214 may have an inductance L of 200 nH with a corresponding DCR of 0.5 mohm. In addition, the inductor 214 may have a maximum current of 20 A and a minimum current of 0 A. A target impedance ($K_1$) of 2 Kohms and a maximum sensed voltage amplitude ($K_2$) of 10 mV may be selected. The capacitor may comprise a standard value choice for C of 0.33 uf.

Using this data, the values of R1, R2 and R3 to achieve the attributes of constant impedance (2 Kohms) and constant gain (0 to 10 mV) may be selected. For example, the values of R1 and R2 may computed by solving the simultaneous equations:

$$L/DCR = (R1/R2)*C$$

and $$I_L*DCR*(R2/(R1+R2)) = K_2 \text{ (maximum sensed voltage amplitude)}$$

In this case, R1=1.21 Kohms and R2=infinite (or absent from the circuit) would closely satisfy the condition to match the time constants and achieve the desired gain from the current sensor 108.

Further, the value of R3 may be determined, such as according to the target impedance. For example, the value may be determined according to the equation:

$$(R1/R2)+R3 = K_1 \text{ (target impedance)}$$

In this case, R3=790 ohms would closely satisfy the condition. Further exemplary choices for the other elements may be ($R_{ext}+R_{int}$)=250 ohms, current mirror gain=4, and $I_{offset}$=10 uA, which may be fixed choices to cover a wide range of possible design points.

Example 2

As another example, the inductor 214 may have an inductance value of 600 nH and a DCR of 2 mohm. The inductor

214 may further have a maximum current of 10 A and a minimum of 0 A. The target constant impedance ($K_1$) may again be set at 2 Kohms and the maximum sensed voltage amplitude ($K_2$) at 10 mV. The capacitor may be a standard value choice of C of 0.33 uf.

The appropriate values of R1, R2 and R3 may be selected to achieve the desired attributes. For example, the values of R1 and R2 are computed by solving the simultaneous equations:

$$L/DCR = (R1/R2)*C$$

and $$I_L * DCR * (R1//R2) = K_2$$

In this case, values of R1=1.82 Kohms and R2=1.82 Kohms closely satisfy the condition.

Next, the value of R3 may be selected such that (R1/R2)+R3=$K_1$=2 Kohms. In this case, R3=1.09 Kohms would closely satisfy the condition. Using these values, a target impedance to the amplifier 218 and a desired current sense signal gain are achieved, and may be achieved over a wide range of inductors and DCR values.

The particular implementations shown and described are illustrative of the invention and its best mode and are not intended to otherwise limit the scope of the present invention in any way. For the sake of brevity, conventional manufacturing, connection, preparation, and other functional aspects of the system may not be described in detail. The connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments. Various modifications and changes may be made, however, without departing from the scope of the present invention as set forth and claimed. The description and figures are to be regarded in an illustrative manner, not a restrictive one, and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

The terms "comprises", "comprising", or any variation thereof, are intended to reference a non-exclusive inclusion, such that a process, method, article, composition, or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, applications, manufacturing specifications, design parameters, or other operating requirements without departing from the general principles of the same.

The invention claimed is:

1. A power supply for supplying a current to a load through an inductor, comprising:
    a control system comprising a PWM controller and adapted to control the current according to an inductor current signal; and
    a current sensor connected to the inductor and the control system and adapted to generate the inductor current signal according to a sensed current in the inductor, wherein the current sensor comprises:
        a series combination of a capacitor and a first resistor, wherein the series combination is adapted to be connected in parallel with the inductor with respect to the load; and
        a second resistor comprising a first terminal connected to a first terminal of the capacitor and a second terminal connected to a second terminal of the capacitor; wherein:
            the DC impedance of the first resistor, the second resistor, and the capacitor substantially match the DC impedance of the inductor with respect to the control system; and
            the resistance of the first resistor and the resistance of the second resistor are selected according to a desired voltage range of the inductor current signal.

2. A power supply according to claim 1, wherein the resistance of the first resistor and the resistance of the second resistor are further selected according to a self resistance of the inductor and an anticipated current range through the inductor.

3. A power supply according to claim 1, wherein the current sensor further comprises a third resistor having a first terminal connected to the first terminal of the second resistor and a second terminal connected to the control system, wherein the resistance of the third resistor is selected according to a target impedance value with respect to the control system.

4. A power supply according to claim 1, further comprising an output stage responsive to the control system and adapted to:
    connect to the inductor; and
    supply the current through the inductor according to a signal from the control system.

5. A power supply according to claim 1, further comprising an amplifier comprising:
    a first input connected to the first terminal of the second resistor;
    a second input connected to the second terminal of the second resistor; and
    an output connected to the control system.

6. A power supply according to claim 5, wherein the first input is connected to the first terminal via a third resistor comprising a first terminal connected to the first terminal of the second resistor and a second terminal connected to the control system, wherein the resistance of the third resistor is selected according to a target impedance value with respect to the control system.

7. A power supply according to claim 1, wherein the control system comprises:

an amplifier comprising:
  a first input connected to the first terminal of the second resistor;
  a second input connected to the second terminal of the second resistor; and
  an output;
a transistor having an input connected to the output of the amplifier; and a current mirror circuit connected to the transistor and adapted to generate a sensed current signal according to a signal from the transistor.

8. A lossless inductor current sense network for providing a sense voltage signal corresponding to a sensed current to a sensing element, comprising:
  an inductor branch, comprising:
    an inductor exhibiting a series parasitic DC resistance (DCR) and comprising an input node and an output node, wherein:
      the input node is coupled to a branch voltage signal; and
      the output node generates an output voltage signal responsive to the branch voltage signal;
  a resistive capacitive (RC) sense circuit comprising a resistor and a capacitor in a series combination, wherein:
    the RC sense circuit is coupled in parallel with the input and output nodes of the inductor branch; and
    a voltage across the capacitor generates a sense voltage signal responsive to the sensed current flowing through the inductor branch;
  a coupling circuit coupled to the RC sense circuit and comprising at least one resistor, wherein the coupling circuit is adapted to present at least one of a target DC impedance and target gain scaling to a sensing element; and
  an amplifier comprising a first input and a second input connected to the RC sense circuit, and an output connected to the sensing element, the first input being connected to the RC sense circuit via the coupling circuit.

9. A current sense network according to claim 8, wherein a resistance of the at least one resistor is selected according to a self resistance of the inductor and an anticipated current range through the inductor.

10. A current sense network according to claim 8, wherein the coupling circuit comprises an impedance resistor having a first terminal connected to a first terminal of the capacitor and a second terminal adapted to be connected to the sensing element, wherein the resistance of the impedance resistor is selected according to the target DC impedance with respect to the sensing element.

11. A current sense network according to claim 8, further comprising:
  a transistor having an input connected to the output of the amplifier; and
  a current mirror circuit connected to the transistor and adapted to generate a sensed current signal according to a signal from the transistor.

12. A method of generating a signal corresponding to a current in an inductor for a sensing element, comprising:
  connecting a series combination of a capacitor and a first resistor in parallel with the inductor; and
  connecting a first terminal of a second resistor to a first terminal of the capacitor;
  connecting a second terminal of the second resistor to a second terminal of the capacitor;
  connecting a first input of an amplifier to the first terminal of the second resistor;
  connecting a second input of the amplifier to the second terminal of the second resistor;
  connecting an output of the amplifier to an input of a transistor;
  connecting a current mirror circuit to the transistor, wherein the current mirror circuit is adapted to generate a sensed current signal according to a signal from the transistor; and
  selecting values for the capacitor, the first resistor, and the second resistor such that:
    the time constant of the first resistor, the second resistor, and the capacitor substantially match the time constant of the inductor with respect to the sensing element; and
    the voltage across the capacitor in response to an anticipated current range in the inductor varies over a desired voltage range.

13. A method of generating a signal according to claim 12, wherein selecting values for the first resistor and the second resistor comprises selecting values for the first resistor and the second resistor according to a self resistance of the inductor.

14. A method of generating a signal according to claim 12, further comprising connecting a first terminal of a third resistor to the first terminal of the second resistor and a second terminal of the third resistor to the first input of the amplifier; and selecting a resistance value of the third resistor according to a target impedance value with respect to the sensing element.

15. A method of generating a signal according to claim 12, further comprising supplying the current through the inductor according to a signal from the sensing element.

16. A method of generating a signal according to claim 12, further comprising:
  connecting a first input of an amplifier to the first terminal of the second resistor;
  connecting a second input of the amplifier to the second terminal of the second resistor; and
  connecting an output of the amplifier to the sensing element.

* * * * *